July 1, 1969     R. F. GRADY, JR     3,452,597
REMOTE TEMPERATURE MEASUREMENT DEVICE
Filed Sept. 9, 1966
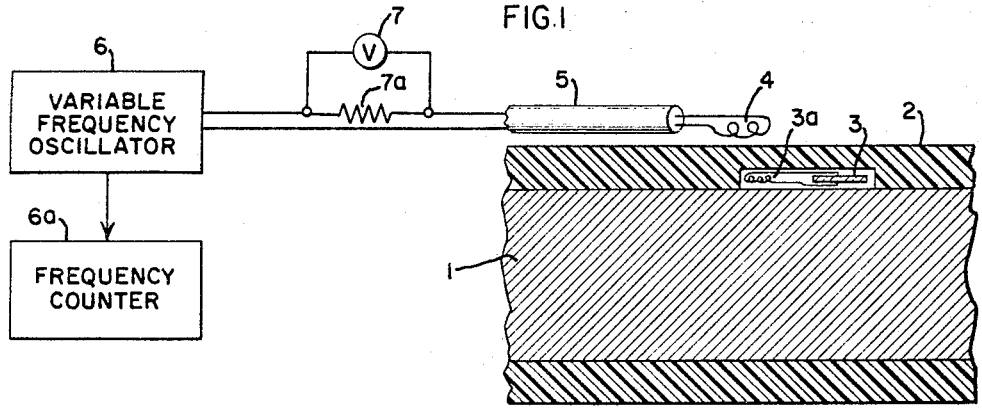
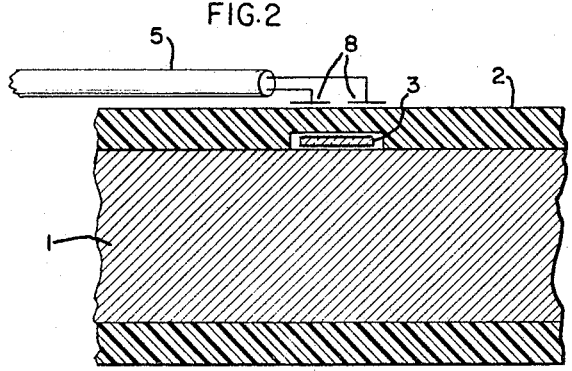
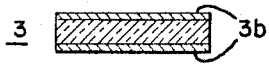
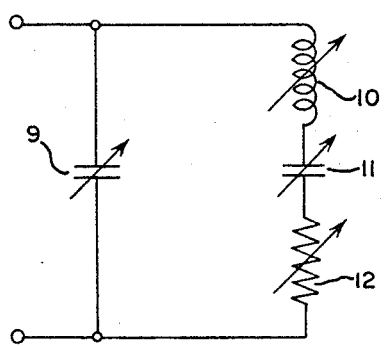
INVENTOR:
RAYMOND F. GRADY, JR
BY *W. C. Cutchen*
HIS ATTORNEY.

United States Patent Office 3,452,597
Patented July 1, 1969

3,452,597
REMOTE TEMPERATURE MEASUREMENT DEVICE
Raymond F. Grady, Jr., Lynn, Mass., assignor to General Electric Company, a corporation of New York
Filed Sept. 9, 1966, Ser. No. 578,369
Int. Cl. G01k 1/08
U.S. Cl. 73—343          4 Claims

ABSTRACT OF THE DISCLOSURE

A direct temperature measuring device utilizing a simple passive resonant circuit as the temperature sensitive element which is embedded within an insulating casing adjacent material to be temperature monitored. An excitation current is supplied by remote electromagnetic or electrostatic coupling to the passive resonant circuit from a source positoned outside the casing whereby the casing need not be punctured to install electrical leads between the current source and the passive circuit.

---

This invention relates to direct temperature measurement of an article surrounded by a coating or casing where, for some reason or another, it is undesirable to pierce the coating for the introduction of electrical leads. More particularly, the invention relates to direct temperature measurement of an insulated conductor without disturbing the integrity of the insulating covering.

The rating of an electrical machine is often limited by the local temperature of a conductor inside an insulated covering. Excessive heat may cause permanent damage to the insulation. For example, the insulation which normally surrounds the conductors in electromagnetic apparatus may reach a temperature where carbonization occurs, resulting in loss of insulating properties. In addition, the insulation may be adversely affected mechanically and become brittle to the extent that cracking readily occurs when the conductors undergo slight displacements or changes in dimension as a result of the normal operating stresses in the conductors.

In the past, a variety of means have been utilized to sense indirectly the temperature of conductors in electromagnetic apparatus. For example, the temperature of the cooling medium, such as oil, hydrogen or air, may be monitored in order to provide an indication of conductor temperature. Since this method of indicating temperature is indirect, it suffers from inaccuracies in estimating the effect of a variety of parameters which affect the total temperature gradient within the apparatus. A large portion of the total temperature drop is contained in the conductor insulation. Therefore, using such methods indicates only an average temperature, which is much lower than the actual average conductor temperature, and further yields almost no information as to actual conductor maximum temperature locations or "hot spots."

Various means have also been employed to obtain direct temperature measurement of insulated conductors. For example, thermocouples, bimetal relays or other heat sensing elements placed in heat exchange relationship with a portion of the conductor have been used. With such devices, it is necessary to puncture the conductor insulation in order to bring out the temperature sensor leads. This has the disadvantage of weakening the properties of the insulation at the point of puncture as well as introducing the problem of insulating the measuring system itself.

It has also been proposed to provide a miniaturized oscillator having a temperature-dependent frequency of oscillation disposed in contact with the conductor inside the insulation. The oscillator acts like a miniaturized radio transmitter providing signals dependent upon the temperature of the conductor. An arrangement is disclosed in U.S. Patent 3,260,116 issued to R. F. Grady, Jr., July 12, 1966 and assigned to the assignee of the present application. Although the latter arrangement serves to provide a direct temperature measurement which is transmitted remotely through the insulation without the necessity of puncturing the insulation for leads, it does contain an active semiconductor device, the tunnel diode, which requires an internal voltage source and is somewhat susceptible to damage due to induced voltage transients or high voltage discharge currents, as is any semiconductor device.

Accordingly, one object of the present invention is to provide a very simple, direct temperature measuring device which uses a single passive element which is inherently less susceptible to electrical damage and does not require an internal power source. Another object of the invention is to provide an improved direct temperature sensor for sensing the local temperature of a conductor with means to provide a remote indication of the temperature without piercing the insulation.

The subject matter which is regarded as the invention is particularly pointed out and distinctly claimed in the concluding portion of the specification. The invention, however, both as to organization and method of practice, together with further objects and advantages thereof, may best be understood by reference to the following description, taken in connection with the accompanying drawing in which:

FIG. 1 is a simplified diagrammatic view of a conductor in cross section and the associated remote indicating devices, FIG. 2 is a modification showing the conductor in cross section with a different type of coupling device, FIG. 3 is an enlarged cross section of the crystal shown in FIGS. 1 and 2, and FIG. 4 is an equivalent circuit for the crystal of FIG. 3.

Briefly stated, the invention is practiced by disposing a crystal inside the insulating sheath of a conductor and in direct heat exchange relationship with the conductor. The crystal is selected to provide a linear coefficient of frequency with respect to temperature in a known manner. The crystal comprises part of a passive circuit inside the insulation which is excited by external means with coupling taking place through the insulation, the coupled impedance serving to indicate the temperature.

Referring now to FIG. 1 of the drawing, the invention in simplest form comprises a conductor 1 surrounded by a sheath of insulation 2. Although conductor 1 is indicated as a single solid conductor, it of course could be a series of lightly insulated strands, such as would be found in the armature bar of a large AC generator. Disposed inside the insulating sheath 2 and in heat exchange relationship with conductor 1 is a crystal 3, having a coupling coil 3a connected thereto. As will be explained, crystal 3 and coil 3a act together as a passive circuit having a natural frequency which varies in a linear manner with the temperature of conductor 1.

Disposed outside the insulating sheath 2 is a second loop or coil 4 which serves as a means of electro-magnetic coupling to the crystal coil 3a. Coil 4 is connected via a shielded cable 5 to a variable frequency oscillator 6 connected to provide oscillations of any desired frequency in coil 4. A parallel-connected voltmeter 7 and resistance 7a are in series with coil 4. Voltmeter 7 will serve to indicate either a peak voltage (in the event of low coupling impedance of crystal 3 due to its series resonance) or a null voltage (in the event of high coupling impedance of crystal 3 due to its parallel resonance). A frequency counter 6a connected to the variable frequency oscillator 6 serves to obtain the exact frequency at which the null or peak occurs.

FIG. 2 illustrates a slight modification of the coupling to crystal 3. Here instead of a coil, electrostatic coupling to crystal 3 is provided by means of dual plate of electrode 8. The remainder of the associated equipment is not shown and is the same as in FIG. 1.

FIG. 3 is an enlarged cross section of crystal 3, wherein it is seen that the crystal 3 is generally rectangular in shape, having thin metal films 3b on opposite flat sides thereof. The thin films can be formed directly on the surface of the crystal by spraying and firing a silver solution, or by evaporation of gold, silver or aluminum.

Reference to FIG. 4 illustrates the equivalent circuit for the crystal 3, wherein capacitance 9 represents the capacitance between the metal films 3b when the crystal is not vibrating, and inductance 10, capacitance 11, and resistance 12 are the electrical equivalents of crystal mass, mechanical compliance, and mechanical friction respectively when the crystal is vibrating.

All of the equivalent elements 9-12 vary with temperature as indicated by the arrows. It is known that the orientation of slicing a crystal, with respect to the axes of the parent crystal, will affect the temperature coefficient of resonant frequency of the crystal. Crystals ordinarily have two modes of resonant frequency, one a series resonance of elements 10 and 11 in FIG. 4, the other a parallel resonance between inductance 10 and the combined effect of capacitances 9 and 11 in FIG. 4. It is known that the crystal can be cut on an orientation sometimes known as "LC" (for linear coefficient) so that variation of the resonant frequency is linear with temperature.

The operation of the invention is as follows. Excitation of the passive crystal circuit (represented by FIG. 4) is accomplished by electromagnetic or electrostatic coupling through the insulating sheath 2. In the case of FIG. 1, the coupled voltage is applied via coil 3a to opposite faces of the crystal by means of connections to layers 3b (see FIG. 3). In the case of FIG. 2, electrostatic coupling is accomplished directly with layers 3b to excite the crystal.

At the resonant frequency, the coupled impedance of the crystal on the oscillator at parallel or series resonance will be very high or very low respectively to provide an indication of a null or peak respectively on voltmeter 7. Since the resonant frequency is linearly dependent upon the temperature of conductor 1, the frequency at which the peak or null appears will be a direct indication of the temperature of conductor 1. The high "Q" normally associated with a crystal permits remote coupling to it through an external circuit.

The components used to excite the crystal and measure the excitation frequency are standard. Suitable components for the carrying out of the invention are a Variable Frequency Oscillator, Model 650A, Voltmeter Model 400E., and Frequency Counter Model 5245L, all manufactured by Hewlett-Packard Company.

Although the invention has been described in connection with measuring temperatures of insulated conductors, it will be seen to be equally applicable to direct temperature measurement of any other article covered by a dielectric casing where it is not desired to disturb the integrity of the casing. For example, temperature of a fluid within a dielectric pressure casing could be measured directly by means of the invention. The only requirement is that the coating or casing be capable of electro-magnetic or electrostatic coupling through the casing.

While there is shown what is considered at present to be the preferred embodiment of the invention, it is of course understood that various other modifications may be made therein.

What I claim as new and desire to secure by Letters Patent of the United States is:

1. In apparatus having material subject to temperature variations surrounded by a dielectric casing, means for measuring the temperature of said material comprising:
   passive circuit means disposed inside said casing in heat exchange relationship with said material and having a temperature-sensitive resonant frequency,
   a source of variable frequency excitation current disposed outside the casing,
   coupling means connected to the excitation source, said coupling means being disposed outside said casing and in coupling relationship with the passive circuit means, and means to indicate the frequency at which resonance of the passive circuit takes place,
   wherein said passive circuit means includes a crystal having a resonant frequency which is substantially directly proportional to temperature.

2. In electrical apparatus, the combination of:
   a current-carrying insulated conductor subject to temperature change in operation,
   passive circuit means including a crystal disposed inside the insulation in heat exchange relationship with said conductor, said crystal having a frequency substantially linear with respect to temperature,
   a source of variable frequency excitation current disposed outside the conductor insulation,
   coupling means connected to the excitation source, said coupling means being disposed outside the insulation and in coupling relationship with said passive circuit means, and
   means to indicate the frequency at which resonance of the passive circuit means takes place.

3. The combination according to claim 2, wherein said passive circuit means includes a first coil inside the insulation and connected to the crystal and wherein said coupling means comprises a second coil providing electromagnetic coupling with the first coil.

4. The combination according to claim 2, wherein said crystal includes a pair of conducting layers on opposite sides of the crystal and wherein said coupling means comprises capacitive plate members disposed to provide electrostatic coupling with said layers.

References Cited

UNITED STATES PATENTS

| | | | |
|---|---|---|---|
| 3,260,116 | 7/1966 | Grady | 73—362 |
| 2,575,922 | 11/1951 | Langenwalter | 73—351 |
| 2,818,732 | 1/1958 | Bennett | 73—351 XR |
| 3,087,886 | 4/1963 | Robinson | 73—362 |
| 3,303,701 | 2/1967 | Matsuura et al. | 73—351 |
| 3,324,724 | 6/1967 | Essers et al. | 73—351 XR |
| 3,338,100 | 8/1967 | Takami | 73—351 |

OTHER REFERENCES

W. L. Smith and W. J. Spencer: Quartz crystal thermometer for measuring temperature deviations in the $10^{-3}$ to $10^{-6}$° C. range, The Review of Scientific Instruments, vol. 34, No. 3, pp. 268–270 (1963).

LOUIS R. PRINCE, Primary Examiner.

DENIS E. CORR, Assistant Examiner.

U.S. Cl. X.R.

73—351, 362